United States Patent
Ogawa et al.

(10) Patent No.: US 7,259,782 B2
(45) Date of Patent: Aug. 21, 2007

(54) TRANSFERRING APPARATUS AND REMOTE CONTROL SYSTEM

(75) Inventors: Kazuyuki Ogawa, Yokohama (JP); Masahiro Muramatsu, Sagamihara (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 1005 days.

(21) Appl. No.: 10/415,266

(22) PCT Filed: Nov. 29, 2001

(86) PCT No.: PCT/JP01/10419

§ 371 (c)(1),
(2), (4) Date: Apr. 28, 2003

(87) PCT Pub. No.: WO02/45354

PCT Pub. Date: Jun. 6, 2002

(65) Prior Publication Data

US 2004/0051786 A1 Mar. 18, 2004

(30) Foreign Application Priority Data

Nov. 30, 2000 (JP) ............................. 2000-366211

(51) Int. Cl.
*H04N 5/225* (2006.01)
*H04N 5/232* (2006.01)

(52) U.S. Cl. ................................ 348/211.99; 348/211.1

(58) Field of Classification Search ............. 348/207.1, 348/207.11, 211.99, 211.1–211.11, 207.99
See application file for complete search history.

(56) References Cited

U.S. PATENT DOCUMENTS

| 5,091,902 | A  | * | 2/1992 | Chopping et al. | 370/223 |
| 6,587,875 | B1 | * | 7/2003 | Ogus | 709/223 |
| 6,629,269 | B1 | * | 9/2003 | Kahkoska | 714/43 |
| 6,785,226 | B1 | * | 8/2004 | Oltman et al. | 370/228 |
| 6,888,800 | B1 | * | 5/2005 | Johnson et al. | 370/247 |
| 2003/0169470 | A1 | * | 9/2003 | Alagar et al. | 359/110 |

\* cited by examiner

*Primary Examiner*—Vivek Srivastava
*Assistant Examiner*—James M. Hannett
(74) *Attorney, Agent, or Firm*—Pearne & Gordon LLP

(57) ABSTRACT

Communicating apparatus to be provided between an intermediate line and transmission lines to establish data communications, the intermediate line and the transmission lines having in combination data pass therethrough, the transmission lines including first line and second line 1 and 2, is designed to select the transmission line from among the first and second lines 1 and 2 based on detecting the data passing through each of the first and second lines 1 and 2 so as to transmit data without collision.

3 Claims, 8 Drawing Sheets

TRANSFERRING APPARATUS AND REMOTE CONTROL SYSTEM

FIELD OF THE INVENTION

The present invention relates to a communicating apparatus for establishing communications with the help of an intermediate line such as the internet and ISDN (Integrated Services Digital Network), and more particularly to a remote control system for ensuring communications to allow a controller in a remote area to control a targeted apparatus via the intermediate line.

DESCRIPTION OF THE RELATED ART

The conventional remote control system of this type is shown in FIG. 7 as comprising transmission lines provided in a local area (referred to simply as "local transmission lines") 1b and 2b, transmission lines provided in a remote area (referred to simply as "remote transmission lines") 1a and 2a, an intermediate line 3 provided between the local area and the remote area, a communicating apparatus (referred to simply as "local communicating apparatus") 10b provided between the local transmission lines 1b and 2b and the intermediate line 3, a communicating apparatus (referred to simply as "remote communicating apparatus") 10a provided between the intermediate line 3 and the remote transmission lines 1a and 2a, a controller (referred to simply as "local controller") 20b connected to the local communicating apparatus 10b via the local transmission lines 1b and 2b, a controller (referred to simply as "remote controller") 20a connected to the remote communicating apparatus 10a via the remote transmission lines 1a and 2a, a watching system apparatus (referred to simply as "targeted apparatus") 30 connected to the local communicating unit 10b via the local transmission lines 1b and 2b, a plurality of cameras 31, a detecting unit 32 having sensors for detecting objects such as intruders.

Here, the intermediate line 3 is indicative of a network such as, for example, ISDN (Integrated Service Digital Network), the intermediate line having terminals to be connected in each of the remote area and the local area.

The local transmission lines include a receiving line (indicative of a first line of the local transmission lines) 1b and a transmitting line (indicative of a second line of the local transmission lines) 2b. The remote transmission lines include a receiving line (indicative of a first line of the remote transmission lines) 1a and a transmitting line (indicative of a second line of the remote transmission lines) 2a. Each of the local transmission lines and the remote transmission lines may have, for example, unbalanced type signal pass therethrough. The term "receiving line" herein described is intended to indicate a line which allows the controller to receive the data transmitted by the targeted apparatus 30. The term "transmitting line" herein described is intended to indicate a line which allows the controller to transmit the data to the targeted apparatus 30.

The conventional communicating apparatus 10 of this type is shown in FIG. 8 as comprising interface means 101 for transmitting and receiving the data via the intermediate line, multiplexer/demultiplexer 102 for multiplexing video data, audio data, and control data into data stream to be outputted to the interface means 101 and for demultiplexing the data stream received by the interface means 101 via the intermediate line into the video data, the audio data, and the control data, transmission controlling means 103 having the transmitting means 112 transmit the data via the second line and having the receiving means 111 receive the data via the first line, receiving means 111 for receiving the data via the first line, and transmitting means 112 for transmitting the data via the second line. The transmission controlling means 103 has buffer memory 115 for buffering the data received by the receiving means 111 and buffer memory 116 for buffering the data to be transmitted via the second line.

The following description will now be directed to the process of the remote controller 20a forming part of the conventional remote control system with reference to FIG. 8. The control signal is initially transmitted by the remote controller 20a to the remote communicating apparatus 10a via the transmitting line 1a of the remote transmission lines. The control signal transmitted by the remote controller 20a is then received by the remote communicating apparatus 10a before the control signal is transmitted by the remote communicating apparatus 10a to the local communicating apparatus 10b. The control signal transmitted by the remote communicating apparatus 10a is then received by the local communicating apparatus 10b before the control signal is transmitted by the communicating apparatus 10b to the targeted apparatus 30 via transmitting line 2b of the local transmissions lines. On the other hand, the response signal with respect to the control signal is transmitted by the targeted apparatus 30 to the local communicating apparatus 10b via the receiving line of the transmission line 1b. The response signal transmitted by the targeted apparatus 30 is received by the local communicating apparatus 10b before the response signal transmitted by the targeted apparatus 30 is transmit by the local communicating apparatus 10b to the remote communicating apparatus 10a. The response signal transmitted by the remote communicating apparatus 10b is then received by the remote communicating apparatus 10a before the response signal transmitted by the communicating apparatus 10a is finally transmitted by the remote communicating apparatus 10a to the remote controller 20a via the receiving line of the transmission lines.

The following description will now be directed to the process of the local controller 20b forming part of the conventional remote control system. The control signal is initially transmitted by the local controller 20b to the targeted apparatus 30 via the transmitting line 2b of the remote transmission lines. On the other hand, the response signal with respect to the control signal received by the targeted apparatus 30 is then transmitted by the targeted apparatus 30 to the local controller 20b via the receiving line 1b of the transmission line.

From the foregoing description, it will be understood that the conventional remote control system allows one of the remote controller 20a and the local controller 20b to control the targeted apparatus 30.

The conventional remote control system thus constructed in the above encounters such a problem that the targeted apparatus is irregularly controlled by each of the remote controller and the local controller after the actual execution state with respect to the targeted apparatus is in disagreement with the execution state finally stored by the remote controller with respect to the targeted apparatus due to the fact that the control data transmitted by one of the remote controller and the local controller to the targeted apparatus cannot be received by the other of the remote controller and the local controller, this leading to the fact that the targeted apparatus is out of control. Consequently, the control data is transmitted by the remote controller 20a to the targeted apparatus 30 after the judgment is made by the remote controller 20a on whether or not the targeted apparatus 30 is controlled by the local controller 20b. Although the intruder, for example, was detected by the targeted apparatus, the camera cannot be controlled immediately by the remote controller.

It is, therefore, an object of the present invention to provide a communicating apparatus and a remote control system which can establish data communications to allow the remote controller to control the targeted apparatus with the help of an intermediate line.

It is another object of the present invention to provide a communicating apparatus and a remote control system which can allow each of the local controller and the remote controller to control the targeted apparatus.

SUMMARY OF THE INVENTION

In accordance with a first aspect of the communicating apparatus according to the present invention, there is provided a communicating apparatus to be provided between an intermediate line and transmission lines to establish data communications, the intermediate line and the transmission lines having in combination data pass therethrough, the transmission lines including first line and second line, comprising: first receiving means for receiving the data via the first line; second receiving means for receiving the data via the second line; interface means for transmitting via the intermediate line the data received by the first receiving means via the first line and the data received by the second receiving means via the second line, and for receiving the data transmitted by an other communicating apparatus via the intermediate lines; first transmitting means for transmitting via the second line the data transmitted via a first receiving means of the other communicating apparatus; first detecting means for detecting the data transmitted via the second line; first controlling means for switching between an operative state and an inoperative state of the first transmitting means based on the data detected by the first detecting means; second transmitting means for transmitting via the first line the data transmitted via a second receiving means of the other communicating apparatus; second detecting means for detecting the data transmitted via the second line; and second controlling means for switching between an operative state and an inoperative state of the second transmitting means based on the data detected by the second detecting means. The communicating apparatus according to the present invention thus constructed as previously mentioned can allow the remote controller in the remote area to control the targeted apparatus in the local area via the intermediate line, and allow each of the remote controller in the remote area and the local controller in the local area to control the targeted apparatus.

In accordance with a another aspect of the remote control system according to the present invention, there is provided a remote control system for ensuring data communications via three different lines including remote transmission lines provided in a remote area, local transmission lines provided in a local area, and intermediate line provided between the local area and the remote area, each of the remote transmission lines and the local transmission lines including first line and second line, the three different lines having in combination data pass therethrough, comprises: local communicating apparatus provided between the intermediate line and the local transmission lines, the local communicating apparatus being constituted by a communicating apparatus described in claim 1; remote communicating apparatus provided between the intermediate line and the remote transmission lines, the remote communicating apparatus being constituted by a communicating apparatus described in claim 1; targeted apparatus connected to the local communicating apparatus via the local transmissions lines; local controller for controlling the targeted apparatus, the local controller being connected to both the local communicating apparatus and the targeted apparatus via the local transmissions lines; and remote controller for controlling the targeted apparatus, the remote controller being connected to the remote communicating apparatus via the remote transmissions lines; wherein the local controller having first receiving means for receiving the data via the first line of the local transmission lines, second receiving means for receiving the data via the second line of the local transmission lines, transmitting means for transmitting the data via the second line of the local transmission lines, detecting means for detecting the data transmitted via the second line, and controlling means for controlling the transmitting means in such a manner that the transmitting means is selectively switched between under the operative state and under the inoperative state based on the data detected by the detecting means; and the remote controller having first receiving means for receiving the data via the second line of the remote transmission lines, second receiving means for receiving the data via the first line of the remote transmission lines, transmitting means for transmitting the data via the second line of the remote transmission lines, detecting means for detecting the data transmitted via the second line, and controlling means for controlling the first transmitting means in such a manner that the transmitting means is selectively switched between under the operative state and under the inoperative state based on the data detected by the detecting means. The remote control system according to the present invention thus constructed as previously mentioned can allow the remote controller in the remote area to control the targeted apparatus via the intermediate line, and allow each of the remote controller in the remote area and the local controller in the local area to control the targeted apparatus.

In the remote control system according to the present invention, a plurality of remote communicating apparatuses, a plurality of remote controllers, and a plurality of remote transmission lines is respectively provided in a plurality of remote areas, each of the remote controllers being operative to controlling the targeted apparatus 30 via the remote communicating apparatus in each of the remote areas. The remote control system according to the present invention thus constructed as previously mentioned can allow each of the remote controllers in the remote areas to control the targeted apparatus.

BRIEF DESCRIPTION OF THE DRAWINGS

The features and advantages of the present invention will become more apparent from the following detailed description when considered in connection with the accompanying drawings, wherein.

DESCRIPTION OF THE PREFERRED EMBODIMENTS

The embodiments of the communicating apparatus and the remote control system according to the present invention will now be described in detail with reference to the drawings.

Figure 1:
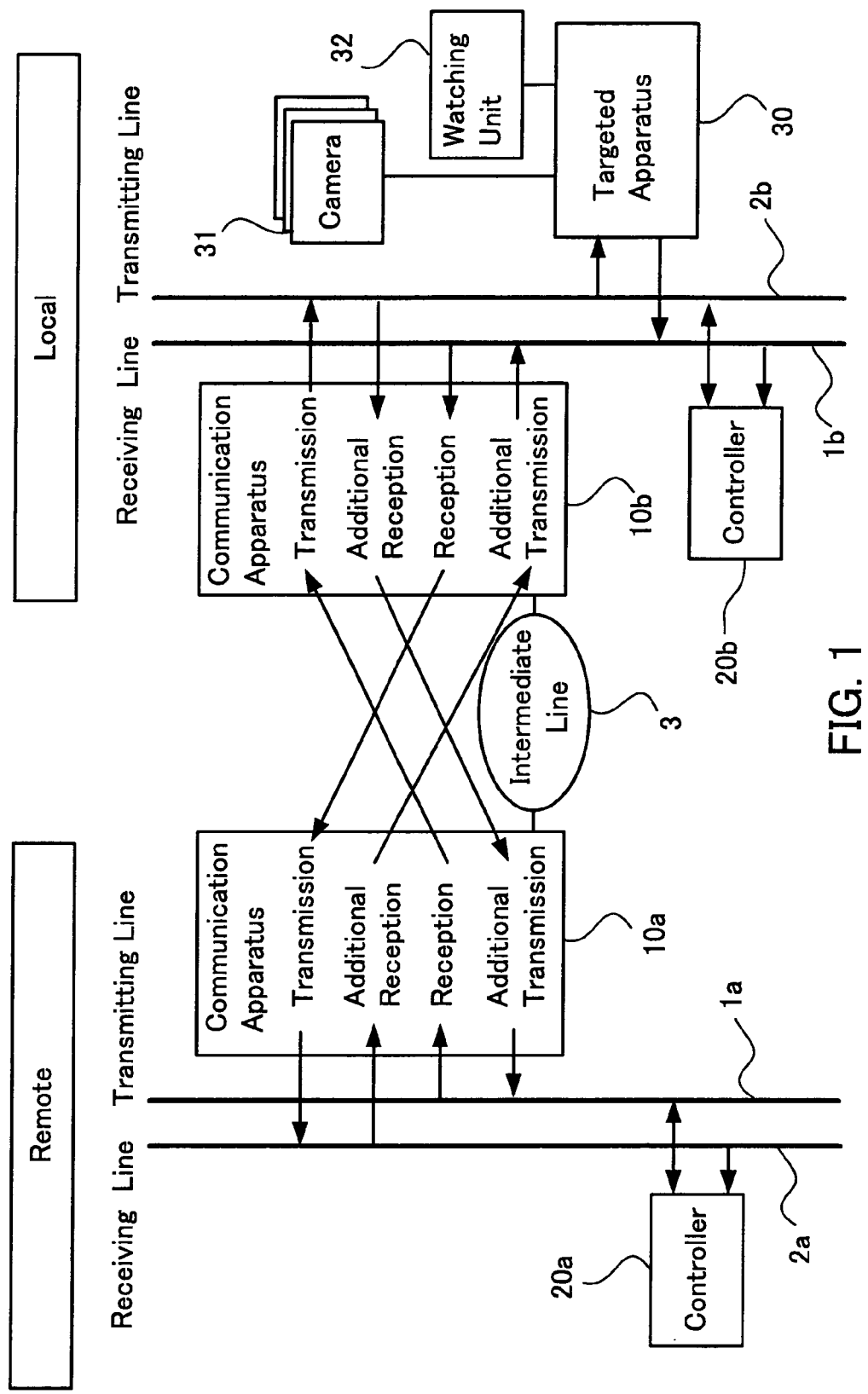
FIG. 1 is a block diagram of the embodiment of the remote control system according to the present invention.

FIG. 1 is a block diagram of the embodiment of the remote control system according to the present invention.

The remote control system is shown in FIG. 1 to comprise transmission lines 1b and 2b provided in a local area (referred to simply as "local transmission lines"), transmission lines 1a and 2a provided in a remote area (referred to simply as "remote transmission lines"), intermediate line 3 provided between the local area and the remote area, a communicating apparatus 10b provided between the local transmission lines 1b and 2b and the intermediate line 3 (referred to simply as "local communicating apparatus"), a communicating apparatus 10a to be provided between the intermediate line 3 and the remote transmission lines 1a and 2a (referred to simply as "remote communicating apparatus"), a controller 20b electrically connected to the local communicating apparatus 10b via the local transmission lines 1b and 2b (referred to simply as "local controller"), a controller 20a electrically connected to the remote communicating apparatus 10a via the remote transmission lines 1a and 2a (referred to simply as "remote controller"), a surveillance apparatus 30 connected to the local communicating unit 10b via the local transmission lines 1b and 2b (referred to simply as "targeted apparatus"), a plurality of cameras 31 connected to the targeted apparatus, a detecting unit 32 having sensors for detecting objects such as intruders.

Here, the intermediate line 3 is indicative of a network such as, for example, ISDN (Integrated Service Digital Network), the local communicating apparatus in the local area being connected to the remote communicating apparatus in the remote area via the intermediate line.

The local transmission lines include a receiving line 1b (indicative of a first line of the local transmission lines) and a transmitting line 2b (indicative of a second line of the local transmission lines), the remote transmission lines including a transmitting line 1a (indicative of a first line of the remote transmission lines) and a receiving line 2a (indicative of a second line of the transmission lines). Each of the local transmission lines and the remote transmission lines may have the data indicative of unbalanced type signal pass therethrough. The term "receiving line" herein described is intended to indicate a line which has each of the local controller and the remote controller receive the data transmitted by the targeted apparatus 30. The term "transmitting line" herein described is intended to indicate a line which has each of the local controller and the remote controller transmit the data to the targeted apparatus 30.

Figure 2:
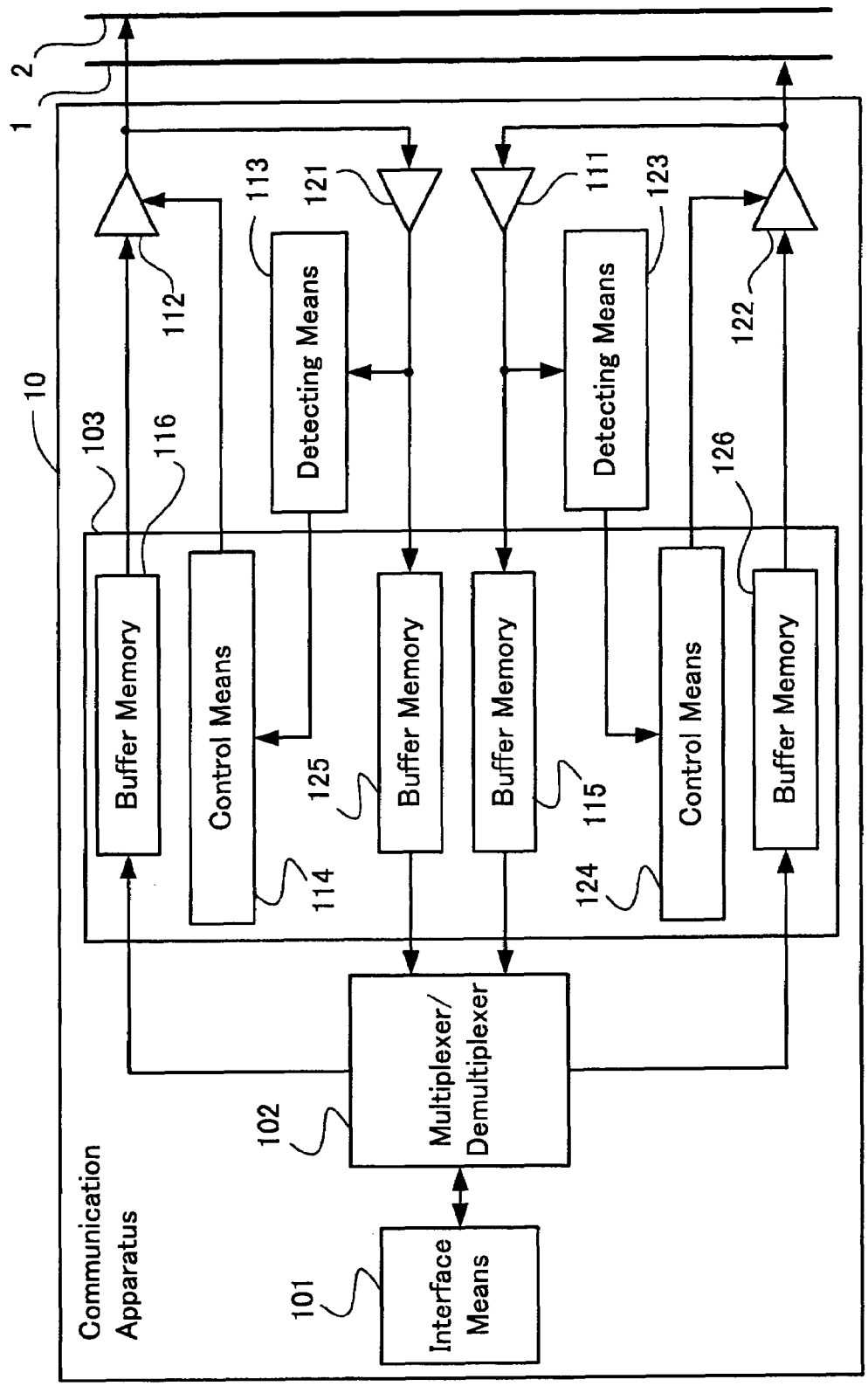
FIG. 2 is a block diagram of the embodiment of the communicating apparatus according to the present invention.

FIG. 2 is a block diagram of the embodiment of the communicating apparatus according to the present invention. The communicating apparatus 10 is shown in FIG. 2 to comprise first receiving means 111 for receiving the data via the first line, second receiving means 121 for receiving the data via the second line, interface means 101 for transmitting via the intermediate line the data received by each of the first receiving means 111 and the second receiving means 121 and for receiving the data via the intermediate lines, multiplexing/demultiplexing means (indicative of multiplexing means and demultiplexing means) 102 for multiplexing the data containing video information, the data containing audio information, and the data containing control information into the data stream to be outputted to the interface means 101, and for demultiplexing the data stream into the data containing the video information, the data containing the audio information, and the data containing the control information after receiving the data stream via the intermediate line, first transmitting means 112 for transmitting via the second line the data received by the interface means 101 via the intermediate line, first detecting means 113 for detecting the data transmitted via the second line, first controlling means 114 for controlling the first transmitting means 112 in such a manner that the first transmitting means 112 is selectively switched between under the operative state and the inoperative state based on the data detected by the first detecting means 113, second transmitting means 122 for transmitting via the first line the data received by the interface means 101 via the intermediate line, second detecting means 123 for detecting the data transmitted via the second line, second controlling means 124 for controlling the second transmitting means 122 in such a manner that the second transmitting means 112 is selectively switched between under the operative state and the inoperative state based on the data detected by the second detecting means 123, buffer memory 115 for buffering the data received by the first receiving means 111, buffer memory 116 for buffering data received by the second receiving means 121, buffer memory 125 for buffering the data to be transmitted via the intermediate line, and buffer memory 126 for buffering the data to be transmitted via the intermediate line.

The transmission controlling means 103 forming one of the local communicating apparatus and the remote communicating apparatus is operative to control the first transmitting means 112 to transmit via the second line the data received via the first line by the other of the local communicating apparatus and the remote communicating apparatus. The transmission controlling means 103 forming one of the local communicating apparatus and the remote communicating apparatus is operative to control the first transmitting means 112 to transmit via the first line the data received via the second line by the other of the local communicating apparatus and the remote communicating apparatus. The interface means 101 forming one of the local communicating apparatus 20b and the remote communicating apparatus 20a is operative to transmit the data containing the identification information indicative of the difference between the data transmitted by the first receiving means 111 via the first line and the data transmitted by the second receiving means 121 via the second line to the other of the local communicating apparatus 20b and the remote communicating apparatus 20a. The difference information indicative of the difference between the data transmitted by the first receiving means 111 via the first line and the data transmitted by the second receiving means 121 via the second line may be included, for example, the header information of the data to be transmitted by one of the local communicating apparatus 20b and the remote communicating apparatus 20a, the difference information being then transmitted to the transmission controlling means 103 of the other of the local communicating apparatus 20b and the remote communicating apparatus 20a.

The transmission controlling means 103 is controlled to ensure that the data transmitted by one of the remote communicating apparatus and the local communicating apparatus via the intermediate line is prevented from being sent back by the interface means 101 of the other of the remote communicating apparatus 10a and local communicating apparatus 10b via the intermediate line.

Each of the first and second detecting means 113 and 123 is constituted by, for example, the standard logic integrated circuit such as a monostable multivibrator, the pulse signal being outputted by the monostable multivibrator during the time interval in which the data is detected. Each of the first and second transmitting means 112 and 122 is adapted to selectively assume two execution states including an operative state indicative of "enable" and an inoperative state indicative of "disable". Each of the first and second controlling means 114 and 124 forming part of the transmission controlling means 103 is operative to control the two execution states of each of the first and second transmitting means 112 and 122 based on the pulse signal outputted by each of the first and second detecting means 113 and 123. The operative state allows each of the first and second transmitting means 112 and 112 to transmit the data, the operative state allowing each of the first and second transmitting means 112 and 122 not to transmit the data. Each of the first and second transmitting means 112 and 122 is referred to as the transmitting data driver.

The local communicating apparatus 10b forming part of the remote control system shown in FIG. 2 is operative to transmit the data via the intermediate line 3 after receiving the data transmitted by the local controller 20b via the transmitting line of the local transmission lines 2b in the additional reception step. The remote communicating apparatus 10a is operative to receive the data transmitted by the local communicating apparatus 10b before transmitting the data via the transmitting line of the remote transmission lines 1a in the additional transmission step. The local communicating apparatus 10b is operative to transmit the data via the intermediate line 3 after receiving the data transmitted by the targeted apparatus 30 via the receiving line of the local transmission lines 1b. The remote communicating apparatus 10a is operative to receive the data transmitted by the local communicating apparatus 10b before transmitting the data via the receiving line of the remote transmission lines 2a. The remote communicating apparatus 10a is operative to receive via the transmitting line of the remote transmission lines 1a the data transmitted by the remote controller 20a before transmitting the data via the intermediate line 3, the local communicating apparatus 10b being operative to receive the data transmitted by the remote communicating apparatus 10a before transmitting via the transmitting line of the local transmission lines 2b.

Figure 3:
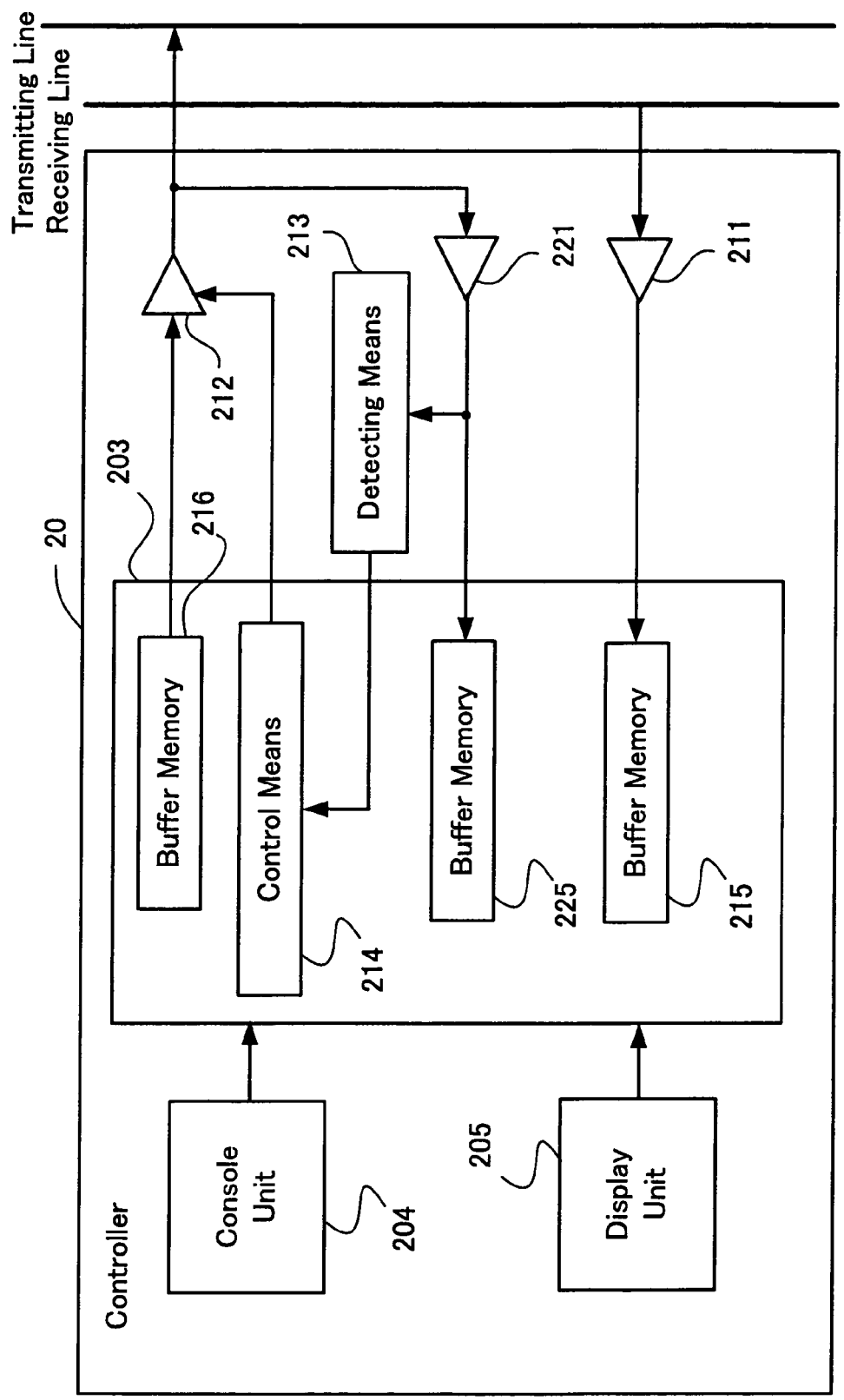
FIG. 3 is a block diagram of the controller forming part of the remote control system according to the present invention shown in FIG. 1.

FIG. 3 is a block diagram of the controller 20 forming part of the remote control system according to the present invention. The controller 20 is shown in FIG. 3 to comprise a console unit 204 for operating the targeted apparatus, a display unit 205 for displaying the information associated with the received data, a first receiving means 211 for receiving the data via the receiving line 1b and 2a (shown in FIG. 1), a second receiving means 221 for receiving the data via the transmitting line 1a and 2b (shown in FIG. 1), a transmitting means 212 for transmitting the data via the transmitting line, detecting means 213 for detecting the data transmitted via the second line, and a transmission controlling means 203 for controlling the transmitting means 212 in such a manner that the transmitting means 212 is selectively switched between under the operative state and the inoperative state based on the data detected by the detecting means 213, The transmission controlling means 203 comprises a controlling means 214 for controlling the execution states of the transmitting means 212 after judging whether or not the data is detected by the detecting means 213, a buffer memory 215 for buffering the data received by the first receiving means 211, a buffer memory 216 for buffering the data received by the second receiving means 221, a buffer memory 225 for buffering the data to be transmit via the transmitting line.

Figure 4:
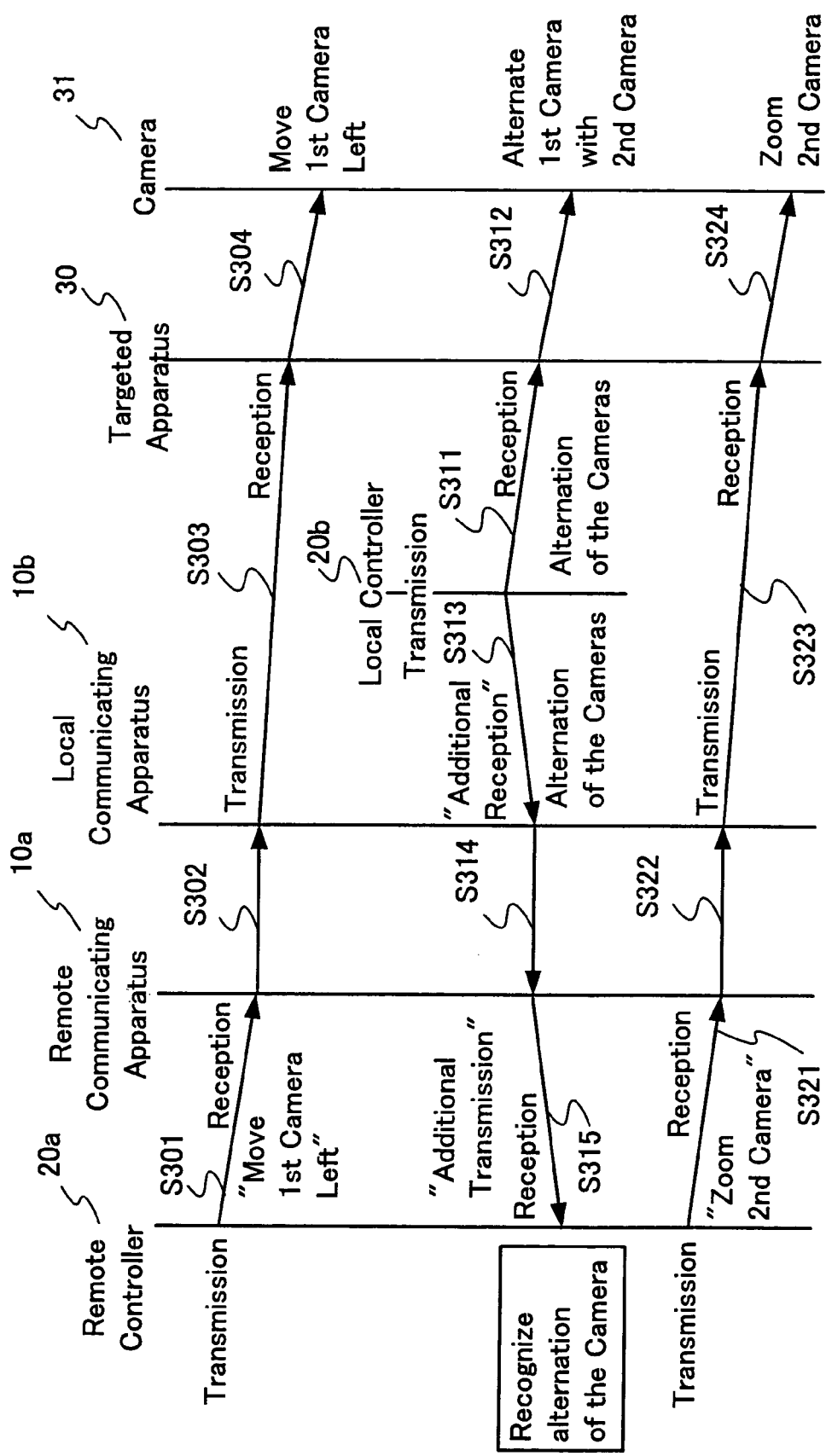
FIG. 4 is a sequence diagram indicative of the process of the remote control system according to the present invention shown in FIG. 1.

FIG. 4 shows a sequence diagram of the embodiment of the process of the remote control system according to the present invention.

The following description will now be directed to the process of the remote controller forming part of the remote control system according to the present invention with reference to FIG. 4. The data indicative of a "move first camera left" instruction, for example, is initially transmitted by the remote controller 20a via the transmitting line of the remote transmission lines 1a (S301), the data indicative of the "move first camera left" instruction is then received by the first receiving means 211 via the transmitting line of the remote transmission lines 1a before transmitting the data indicative of the "move first camera left" instruction via the intermediate line 3 (S302). The data indicative of the "move first camera left" instruction is then received by the interface means 101 via the intermediate line 3 before the data indicative of the "move first camera left" instruction is transmitted by the first transmitting means 112 via the transmitting line of the local transmission lines (S303). The data indicative of the "move first camera left" instruction is finally received by the targeted apparatus 30 via the transmitting line of the local transmission lines before the targeted apparatus 30 has the first camera 31 move to the left (S304).

Under the state above mentioned, the data indicative of an "alternative camera" instruction to be performed by the targeted apparatus 30 is initially transmitted by the local controller 20b via the transmitting line of the local transmission line (indicative of the second line of the local transmission line) (S311), the second camera being then selected by the targeted apparatus after receiving the data indicative of the "alternative camera" instruction (S312). The data indicative of an "alternative camera" instruction is then received by the second receiving means of the local communicating apparatus 10b via the transmission line of the local transmission lines (indicative of the second line of the local transmission lines) in the additional reception step (S313) before transmitting the data indicative of an "alternative camera" instruction (S314). The data indicative of an "alternative camera" instruction is received by the interface means of the remote communicating apparatus 10a via the intermediate line before the data indicative of an "alternative camera" instruction via the transmitting line of the remote transmission line (indicative of the first line of the remote transmission line) is transmitted by the second transmitting means in the additional transmission step (S315). The data indicative of an "alternative camera" instruction is then received by the second receiving means of the remote communicating apparatus 20a via the transmitting line. From the foregoing description, it will be understood that the data indicative of an "alternative camera" instruction transmitted by the local controller 10b can be received and recognized as the control signal of the local controller 10b by the remote controller 10a. This leads to the fact that the data, for example, indicative of a "zooming second camera" instruction is transmitted by the remote controller 10a to the targeted apparatus 30 via the remote communicating apparatus 10a and local communicating apparatus 10b before the data indicative of a "zooming second camera" instruction is correctively performed by the targeted apparatus 30 (S321, S322, S323, S324).

Figure 5:
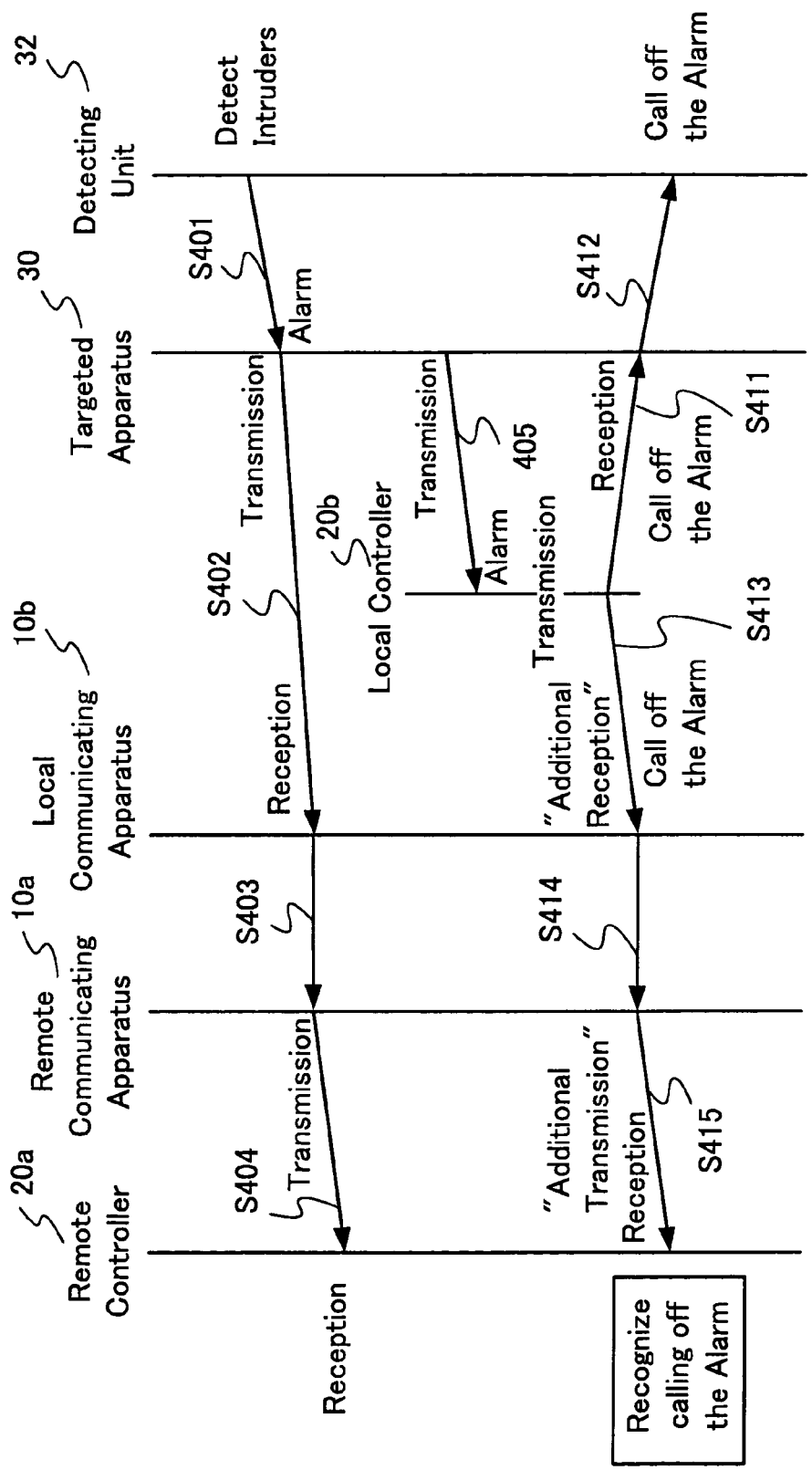
FIG. 5 is a sequence diagram indicative of the process of the remote control system according to the present invention shown in FIG. 1.

FIG. 5 shows a sequence diagram indicative of the process of the embodiment of the remote control system according to the present invention.

The following description will now be directed to the process of the remote control system according to the present invention with reference to FIG. 5. The intruder, for example, is initially detected by the detecting unit 32 before the "alarm" signal is outputted by the detecting unit 32 to the targeted apparatus 30 (S401). The data indicative of the "alarm" information is then transmitted by the targeted apparatus 30 via the receiving line of the local transmission lines, (S402). The data indicative of the "alarm" information is then received by the local communicating apparatus 10b via the receiving line of the local transmission lines before the data indicative of the "alarm" information is transmit by the interface means 101 of the local communicating apparatus 10b via the intermediate line (S403). The data indicative of the "alarm" information is then received by the interface means 101 of the remote communicating apparatus 10 a via the intermediate line (S404) before the data indicative of the "alarm" information is then received by the remote controller 20a.

Under the state above mentioned, the data indicative of the "alarm" information is initially received by the local controller 20b via the receiving line of the local transmission line (S405). The data indicative of the "cancel alarm" instruction to be performed by the targeted apparatus 30 is then transmitted by the local controller 20b via the receiving line of the local transmission line (indicative of the second line of the local transmission lines) (S411), the data indicative of the "cancel alarm" instruction being then received by the targeted apparatus 30 via the transmitting line of the local transmission lines before the targeted apparatus 30 has survey unit 32 cancel the alarm. The data indicative of the "cancel alarm" instruction is then received by the second receiving means of the local communicating apparatus 20b via the transmitting line of the local transmission lines (indicative of the second line of the local transmission lines) (S413), the data indicative of the "cancel alarm" instruction being then transmitted by the interface means 101 of the local communicating apparatus 20b via the intermediate line (S414). The data indicative of the "cancel alarm" instruction is then received by the interface means 101 of the remote communicating apparatus 20a via the intermediate line before the data indicative of the "cancel alarm" instruction is then transmitted by the second transmitting means via the transmitting line of the remote transmission lines (indicative of the first line of the remote transmission lines) in the additional transmission step (S415). The data indicative of the "cancel alarm" instruction is finally received by the second receiving means of the remote controller 20a via the transmitting line. From the foregoing description, it will be understood that the data indicative of the "cancel alarm " instruction transmitted by the local controller 10b can be received and recognized as the control signal of the local controller 10b by the remote controller 10a.

Figure 6:
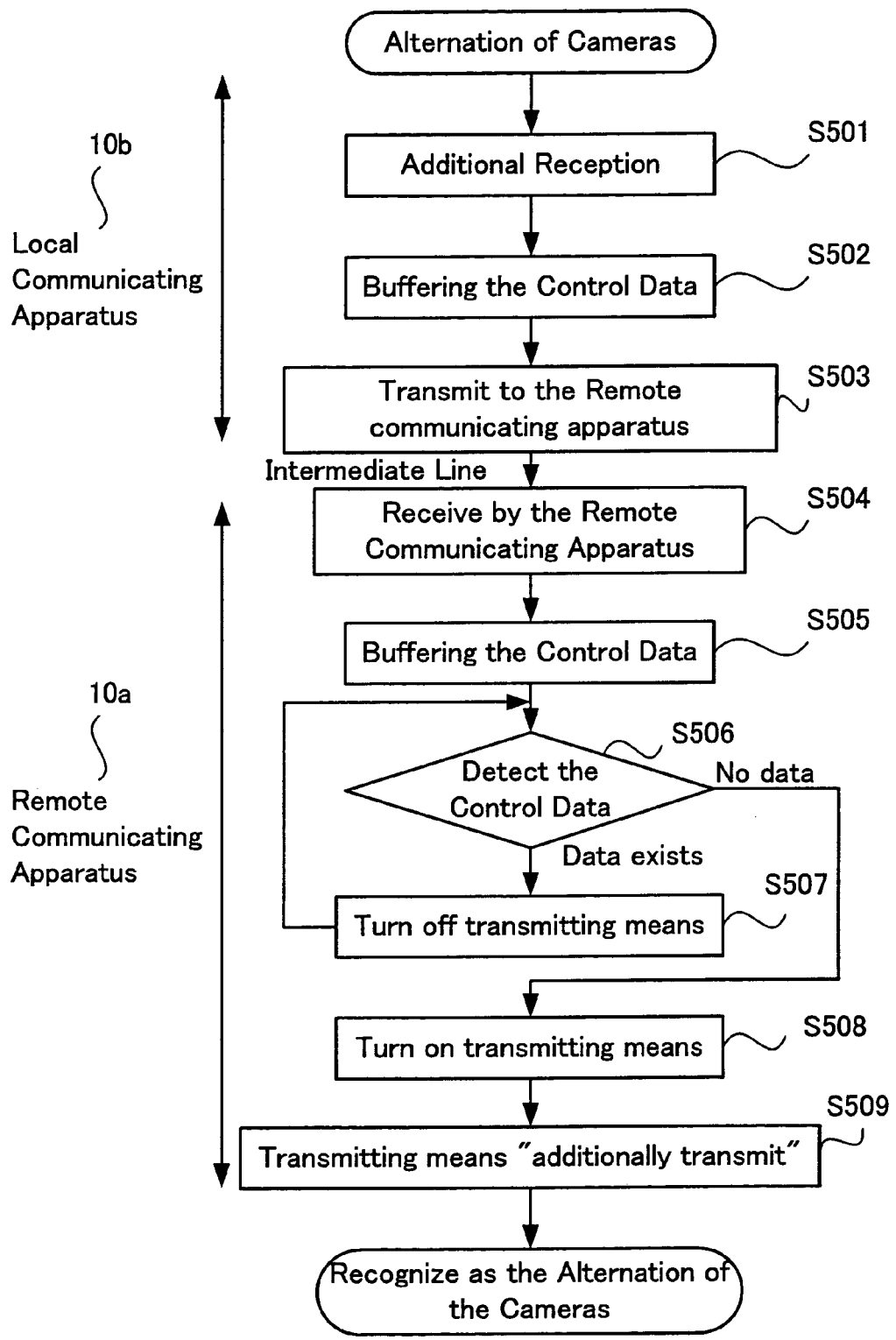
FIG. 6 is a flowchart of the process of the communicating apparatus shown in FIG. 2.
Figure 7:
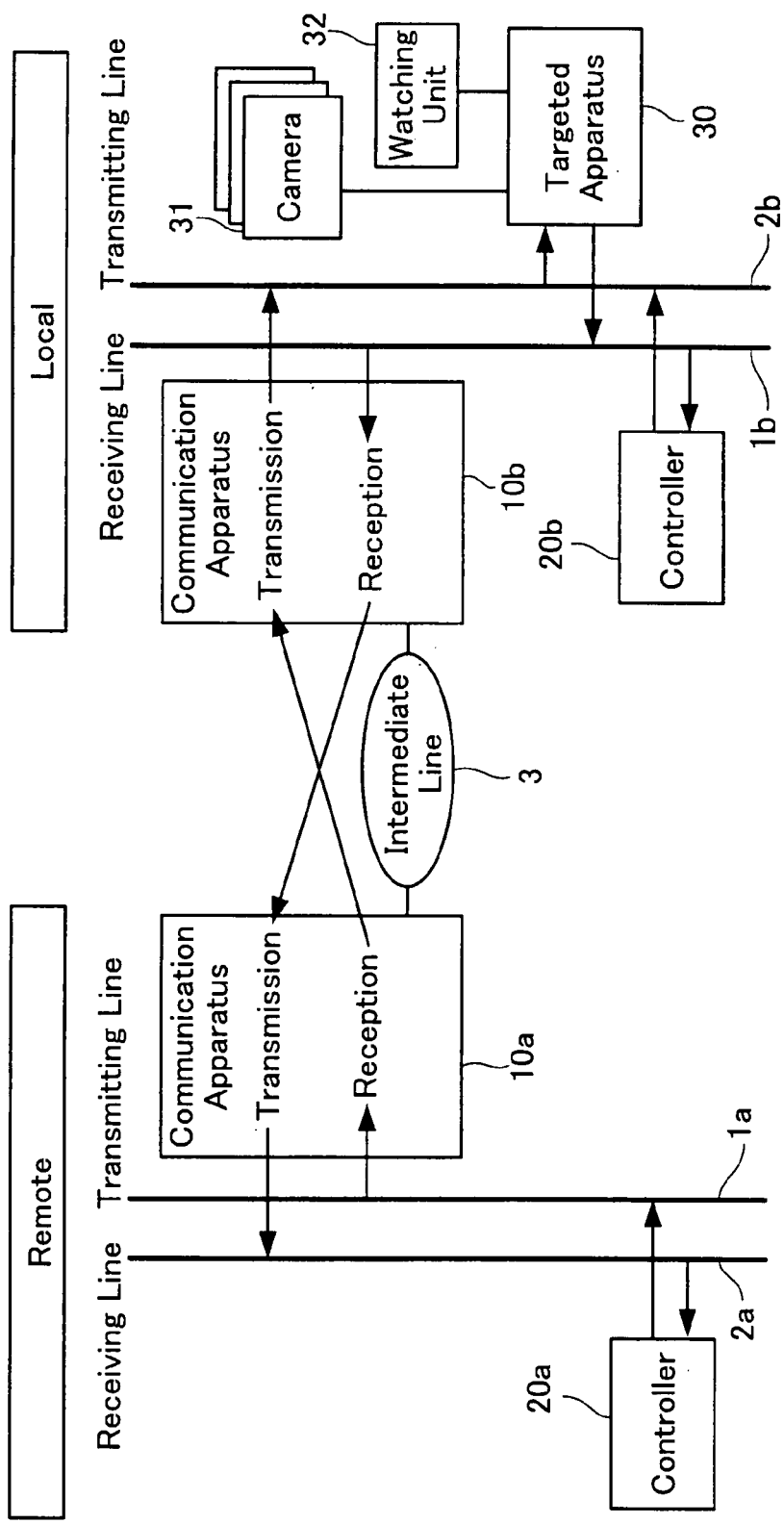
FIG. 7 is a block diagram of the conventional remote control system.
Figure 8:
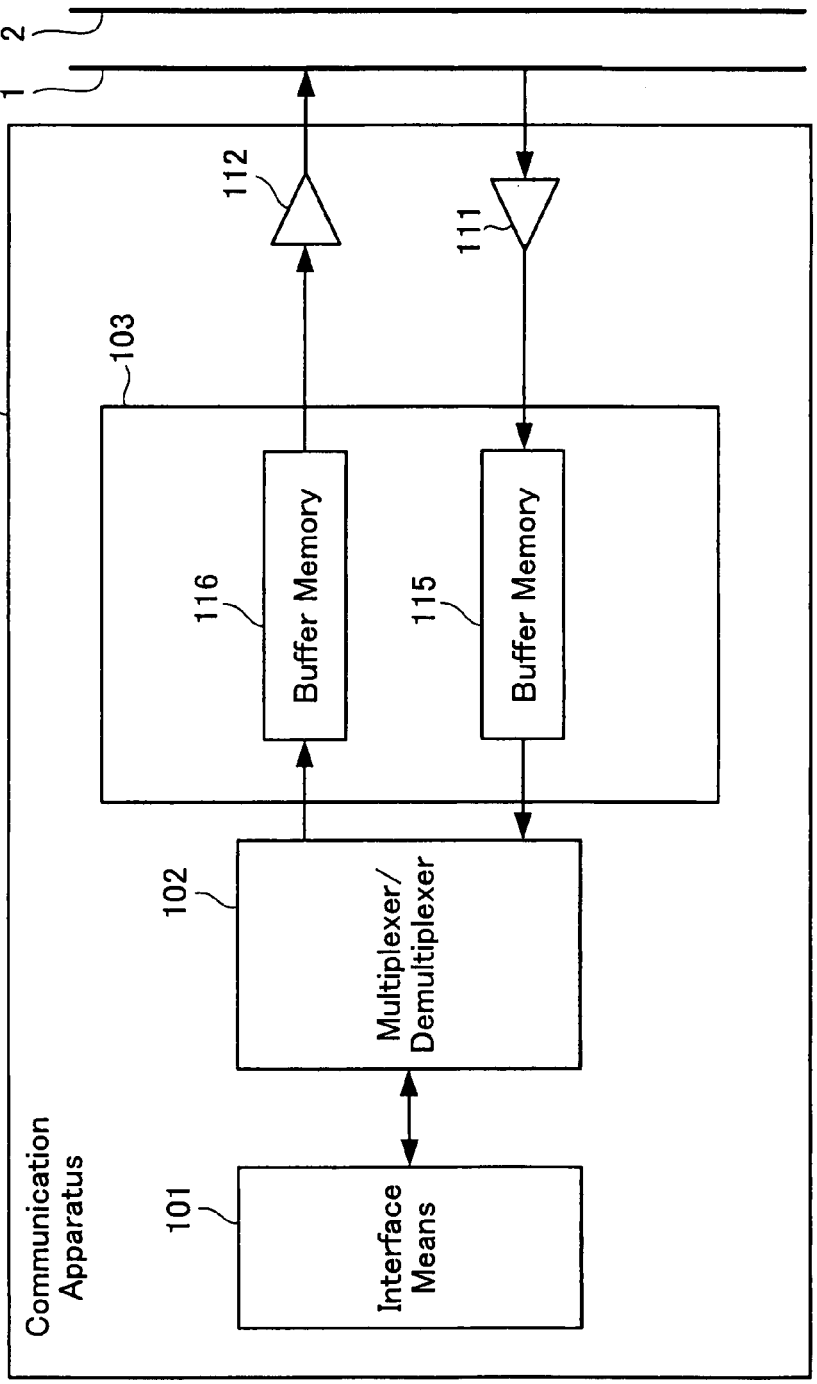
FIG. 8 is a block diagram of the conventional communicating apparatus.

FIG. 6 is a flowchart of the process of the remote control system shown in FIG. 2. The following description will now be directed to the process of the remote control system according to the present invention with reference to FIG. 6.

The data indicative of the "alternative camera" instruction (referred to simply as "control data") is initially transmitted by the local controller 10b via the transmitting line before the control signal is received by the second receiving means 121 of the local communicating apparatus 20b via transmitting line (indicative of the second line of the local transmission line) in the additional reception-step (S501). The control data received by the second receiving means 121 is then buffered by the buffer memory 125 (S502). The control data buffered by the buffer memory 125 is then transmitted by the interfacing circuit 101 via the intermediate line (S503), wherein the control data including information in which the control data is indicative of the additional data (i.e. the control data is received via the second line), the control data being received by the remote controller 20a.

The control data is then received by the interface means 101 of the remote communicating apparatus 10a (S504) before the control data is recognized by the interface means as the additional data. The control data received by the interfacing circuit 101 is then buffered by the second buffer memory 126 (S505). The control data received by the first receiving means 111 via the transmitting line of the remote transmission line is then detected by the first detecting means 113 (S506). (i.e. the control data is detected.) Here, the detecting means 123 allow the controlling means 124 to control the first transmitting means 122 not to transmit the control data in the disable step (S507) after the judgment is made by the detecting means 113 on whether as the control data received by the first receiving means 111 via the transmitting line of the remote transmission line is received by the first receiving means 111. The detecting means 123, on the other hand, allow the controlling means 124 to control the first transmitting means 122 to transmit the control data in the enable step (S508) after the judgment is made by the detecting means 113 on whether as the control data received by the first receiving means 111 via the transmitting line of the remote transmission line is not received by the first receiving means 111. The control data transmitted by the local controller 20b to the targeted apparatus 30 is received by the remote controller 20a via transmitting line after the control data is transmitted by the second transmitting means 122 transmitting line in the additional transmission step (S509). From the above detailed description, it will be understood that the data indicative of the "alternative camera" instruction transmitted by the local controller 20b can be received and recognized as the control data by the remote controller 20a.

From the above detailed description of the embodiment of the remote control system, it will be understood that the control data transmitted by the local controller to the targeted apparatus can be received by the remote controller due to the fact that the remote controller is adapted to receive the control data transmitted by the remote communicating apparatus via transmitting line after the control data transmitted by the local controller to the targeted apparatus is received by the local communicating apparatus to have the local communicating apparatus transmit to the remote communicating apparatus via the intermediate line, this leading to the fact that the targeted apparatus is controlled by each of the controllers in remote areas.

Although the previously mentioned embodiment as shown in FIG. 1 has been described with only one targeted apparatus connected to the local communicating apparatus via the local transmission lines, two targeted apparatuses may be respectively connected to the local communicating apparatus and the remote communicating apparatus to allow each of the local communicating apparatus and the remote communicating apparatus to control each of two targeted apparatus to achieve the advantage of the remote control system according to the present invention.

In the above embodiment, the remote communicating apparatus connected to the remote controller is provided in only one remote area to allow the remote controller to control the targeted apparatus, however, there may be a plurality of remote communicating apparatuses respectively connected to the remote controllers respectively provided in plurality of remote areas to allow each of the remote controllers to control the targeted apparatus to achieve the advantage of the remote control system according to the present invention.

While there has been described in the forgoing embodiment about the fact that the multiplexing/demultiplexing means forming one of the remote and local communicating apparatus is operative to extract the control data from the data transmitted additionally by the other of the remote and local communicating apparatus to transmit only control data via the transmission lines, the control data received by one of the remote and local communicating apparatus may not be extracted by the multiplexing and demultiplexing means, but may be still remained in the data transmitted by the other of the remote and local communicating apparatus to achieve the advantage of the remote control system according to the present invention. With the control data extracted by one of the remote and local communicating apparatus, the control data may be transmitted to the other of the remote and local communicating apparatus to achieve the advantage of the remote control system according to the present invention.

As will be seen from the foregoing description, the communicating apparatus and the remote control system according to the present invention can provide a communicating apparatus and a remote control system which can allow the controller provided in each of the remote areas to control the targeted apparatus.

What is claimed is:

1. Communicating apparatus to be provided between an intermediate line and transmission lines to establish data communications, said intermediate line and said transmission lines having in combination data pass therethrough, said transmission lines including first line and second line, comprising:

first receiving means for receiving said data via said first line;

second receiving means for receiving said data via said second line;

interface means for transmitting via said intermediate line said data received by said first receiving means via said first line and said data received by said second receiving means via said second line, and for receiving said data transmitted by an other communicating apparatus via said intermediate lines;

first transmitting means for transmitting via said second line said data transmitted via a first receiving means of said other communicating apparatus;

first detecting means for detecting said data transmitted via said second line;

first controlling means for controlling said first transmitting means in such a manner that said first transmitting means is selectively switched between under its operative state and under its inoperative state based on said data detected by said first detecting means;

second transmitting means for transmitting via said first line said data transmitted via a second receiving means of said other communicating apparatus;

second detecting means for detecting said data transmitted via said second line; and second controlling means for controlling said second transmitting means in such a manner that said second transmitting means is selectively switching between under its operative state and under its inoperative state of said second transmitting means based on said data detected by said second detecting means.

2. A remote control system for ensuring data communications via three different lines including remote transmission lines provided in a remote area, local transmission lines provided in a local area, and intermediate line provided between said local area and said remote area, each of said remote transmission lines and said local transmission lines including first line and second line, said three different lines having in combination data pass therethrough, comprises:

local communicating apparatus provided between said intermediate line and said local transmission lines, said local communicating apparatus being constituted by a communicating apparatus described in claim 1;

remote communicating apparatus provided between said intermediate line and said remote transmission lines, said remote communicating apparatus being constituted by a communicating apparatus described in claim 1;

targeted apparatus connected to said local communicating apparatus via said local transmissions lines;

local controller for controlling said targeted apparatus, said local controller being connected to both said local communicating apparatus and said targeted apparatus via said local transmissions lines; and remote controller for controlling said targeted apparatus, said remote controller being connected to said remote communicating apparatus via said remote transmissions lines;

wherein said local controller having first receiving means for receiving said data via said first line of said local transmission lines, second receiving means for receiving said data via said second line of said local transmission lines, transmitting means for transmitting said data via said second line of said local transmission lines, detecting means for detecting said data transmitted via said second line, and controlling means for controlling said transmitting means in such a manner that said transmitting means is selectively switched between under its operative state and under its inoperative state based on said data detected by said detecting means; and said remote controller having first receiving means for receiving said data via said second line of said remote transmission lines, second receiving means for receiving said data via said first line of said remote transmission lines, transmitting means for transmitting said data via said second line of said remote transmission lines, detecting means for detecting said data transmitted via said second line, and controlling means for controlling said first transmitting means in such a manner that said transmitting means is selectively switched between under its operative state and under its inoperative state based on said data detected by said detecting means.

3. A remote control system as set forth in claim 2, in which a plurality of remote communicating apparatuses, a plurality of remote controllers, and a plurality of remote transmission lines is respectively provided in a plurality of remote areas, each of said remote controllers being operative to controlling said targeted apparatus 30 via said remote communicating apparatus in each of said remote areas.

* * * * *